INVENTOR
GEORGE R. STIBITZ
BY Darby & Darby
ATTORNEYS

Nov. 3, 1959
G. R. STIBITZ
2,910,872
FUNCTION UNIT
Filed April 13, 1954
2 Sheets-Sheet 2
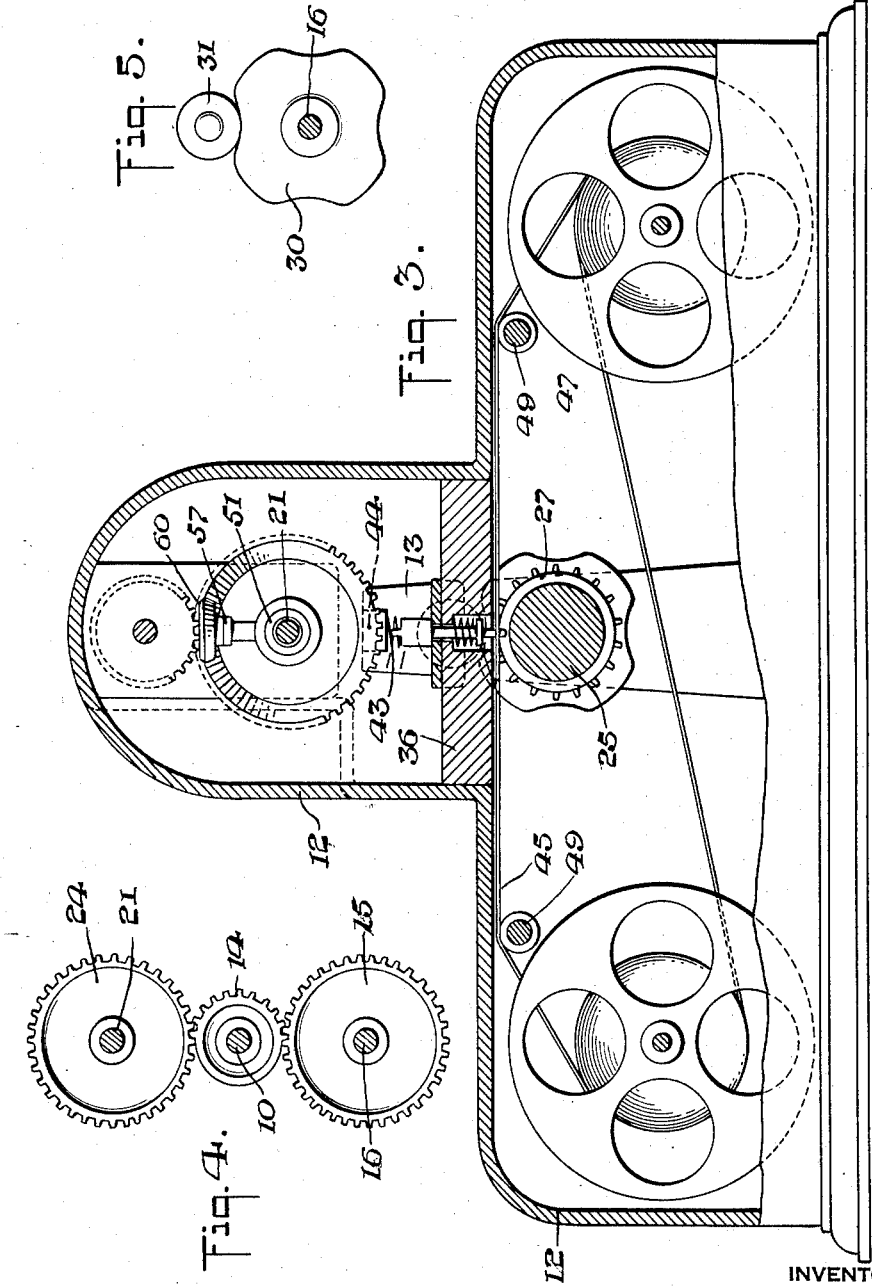
INVENTOR
GEORGE R. STIBITZ
BY Darby & Darby
ATTORNEYS

United States Patent Office 2,910,872
Patented Nov. 3, 1959

2,910,872

FUNCTION UNIT

George R. Stibitz, Burlington, Vt.

Application April 13, 1954, Serial No. 422,790

12 Claims. (Cl. 74—1)

The present invention relates to function units, that is, devices which serve to transform an input movement into an output movement in accordance with some mathematical law or arbitrary relationship.

More particularly, the invention relates to a device by means of which a certain number of increments of revolution of an input shaft causes an output shaft to rotate through a number of increments of revolution dependent upon the input revolution increments as modified in accordance with some mathematical law or arbitrary relationship. In these devices a controlling element is interposed between the input shaft and the output shaft and this element incorporates the law which is to be followed. The controlling element is not permanently incorporated in the mechanism but is changeable so that the law of operation of the output shaft with respect to the input shaft may be changed at will.

By combination of a number of such function units together with differential drives, complex mathematical computations may be made with extreme ease and with great saving in time over manual methods of performing the same computations. By means of such combinations of units, multiplication, transformation to sines or cosines of angles and various other resolutions of mathematical quantities and forces represented thereby may be performed. Additionally, these function units may be utilized for control of machine operations, as for example, milling machine operations, lathe operations, etc.

As indicated above, the basic principles underlying the construction of these function units is that upon a certain increment of rotation of a shaft X another shaft Y will be rotated in a predetermined relation to shaft X. This relationship may of course be formally represented by the equation $Y=f(X)$. For example, this relationship may be as follows:

When $X=0°$  $Y=437°$
When $X=10°$  $Y=485°$
When $X=20°$  $Y=450°$ etc.

Such a condition can be satisfied by the ordinary cam surface but with the disadvantage that in the cam arrangement purely measured lengths are utilized whereas in my function units the values X and Y are primarily counted quantities and due to the fact that counting is an exact process are not liable to error as is the position of a cam along a measured length thereof.

Since my function units comprise shafts and gearing all cumulative error is eliminated, for no matter how many revolutions the geared shafts may make their relative positions are always known with an accuracy depending only upon the backlash of the gear train, which is constant rather than cumulative.

Moreover, since the controlling element may be a tape, a wire or other similar device serving as a positive controlling means and being therefore similar to a gear and since the tape may conveniently be of great length so that each unit of movement effects a small adjustment of the output shaft relative to the total movement of the output shaft, it is possible to provide a large scale factor. In other words, the output is a shaft rotation which is positively related in any arbitrary predetermined manner to the rotation of the input shaft and the relative accuracy is limited only by the tape length and not by the precision of workmanship.

The present application is a division of my prior application Serial No. 7982 now abandoned, filed February 12, 1948. The present application is limited to an embodiment of the invention wherein the controlling tape does not drive the output shaft but, on the contrary, merely controls the drive thereof which is effected directly from the input shaft. All other embodiments of the invention disclosed in my prior application above-mentioned are now disclosed and claimed in my copending continuation application Serial No. 320,175 now Patent 2,650,500, filed concurrently herewith.

In the instant device the controlling element is in the form of a tape which is driven through a definite distance for each increment of angular movement of the input shaft, the tape bearing thereon a physical pattern which effects control of an output shaft so that the angular increments of rotation of the output shaft bear a definite predetermined relationship to the angular increments of movement of the input shaft. The mechanisms are so arranged as to provide a positive interlock between the input and output shafts assuring that the output shaft will always be moved through a correct number of angular increments, any incorrect movement being impossible because of the positive interlock.

It will be understood that the function unit of this application may be combined with other equipment such for example as differential drives in order to perform the various computational solutions and machine controls hereinabove and hereinafter mentioned.

As an example of such combination which will be further described subsequently, it is possible by the utilization of two function units and three differential drives to compute the product of two factors $x$ and $y$, this being accomplished by solving the equation in the following manner: In one differential $x$ and $y$ are added and in the second differential $x$ and $y$ are subtracted. In a function unit associated with the first differential the sum $(x+y)$ is squared and in a second function unit the difference $(x-y)$ is squared. Following this, in a third differential, the output of the second function unit is subtracted from the output of the first and by a proper gearing or scale dimensioning, the output of this third and final differential becomes the desired product. In other words, the product $xy$ is found by utilizing the equations:

$$\frac{1}{4}(x+y)^2-\frac{1}{4}(x-y)^2=\frac{1}{4}(x^2+2xy+y^2)$$
$$-\frac{1}{4}(x^2-2xy+y^2)=\frac{4xy}{4}=xy$$

In a similar manner, a combination of three function units and three differentials may be utilized to compute the value of $r$ sine $\theta$ when the values of $r$ and the angle $\theta$ but not its sine are known.

It is an object of the present invention to provide a device in which a large number of rotations of an input shaft will cause a likewise relatively large number of rotations of an output shaft, the exact number being dependent upon a control intermediate the shafts, in accordance with a particular mathematical or arbitrary law or relationship.

Another object of the invention is to provide such a unit as that described above which may be readily combined with other units of the same character and with other mechanical devices such as differential drives to perform solutions of involved mathematical equations.

It is still another object of the invention to provide such function units which, in combination, and in combination with mechanical devices such as differential drives may be utilized to control operation of machine tools, such as milling machines, lathes, shapers, cam cutters, etc.

It is a further object of the invention to provide means for entering the law of operation into these function units which means are simple in construction and in operation, and which operate as counters rather than as scaler variations.

It is a still further object of the invention to provide means for entering the law of operations into the function units which means may be easily made and readily inserted into and removed from the function unit in order that the same basic unit may be utilized to control operation in accordance with different mathematical and arbitrary relationships.

Other objects and features of the invention will appear when the following description is considered in connection with the annexed drawings, in which, Figure 1 is an end elevation (of a function unit in accordance with my invention) with the cover broken away and certain of the operating parts shown in vertical cross-section;

Figure 3 is a vertical cross-sectional view of the function unit of Figure 1, the view being taken on the planes of line 3—3 of Figure 1;

Figures 1, 2:
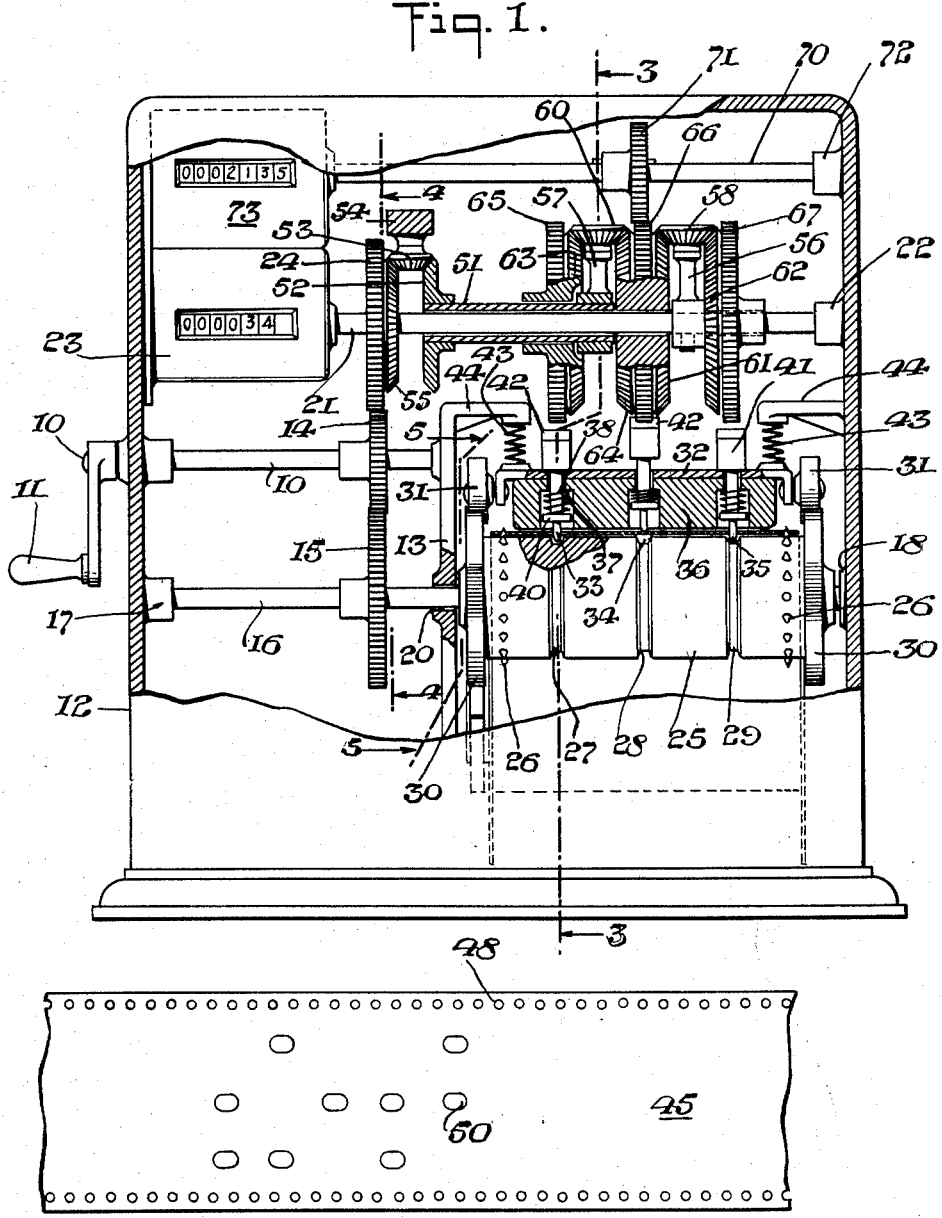
Figure 2 is a fragmentary view of a controlling tape suitable for use with the unit of Figure 1.

Figure 4 is a fragmentary detail view showing the gear train by means of which the input shaft and an intermediate shaft are alternately driven by means of the input crank the view being taken on the plane of the line 4—4 of Figure 1; and Figure 5 is a fragmentary detail view showing the cam utilized for lifting certain feeler pins of the mechanism of Figures 1 and 3, this view being taken on the plane of the line 5—5 of Figure 1.

Referring now to the drawings and particularly to Figures 1 and 3, there is shown therein at 10 a shaft having a handle 11 affixed thereto external of the machine housing 12. The shaft 10 is supported at one end in the housing 12 and at the opposite end in a bracket 13 which is fixed to the base of the device in any suitable manner.

Fixedly mounted on shaft 10 is a mutilated gear 14 (see also Figure 4) which mutilated gear meshes with a gear 15 fixed to shaft 16. Shaft 16 is supported at one end in a bearing 17 fixed to the housing 12 and at its opposite end in a bearing 18 fixed to the housing 12 at the opposite side thereof. This shaft extends through an aperture 20 in the bracket 13.

A third shaft 21 is supported in a bearing 22 fixed to housing 12 at its right-hand end and at its left-hand end supported by being rigidly connected to a shaft on a counter 23 which is in turn fixed to the housing 12.

Shaft 21 carries a spur gear 24 fixed thereto which gear meshes with the mutilated gear 14. Gear 14 is provided with teeth of one-half of its circumference only and thus alternately drives the gears 15 and 24. The mutilated gear 14 is so shaped that it locks the non-driven gear against rotation.

Mounted on shaft 16 for rotation therewith is a grooved drum 25 having sprocket teeth 26 at its opposite ends and having the three peripheral grooves 27, 28 and 29 spaced along its length.

Additionally the shaft 16 has mounted thereon for rotation therewith two cams 30 one of which is shown in detail in Figure 5. Cooperating with the cams 30 are two cam rollers 31. These cam rollers are rotatably mounted one at either end of a bar 32 which bar extends axially of and above the drum 25 and is provided with three bores respectively located above the three grooves 27, 28 and 29.

As is clearly seen in Figure 3, three sensing fingers 33, 34 and 35 are mounted in a plate 36 which is supported by the upper extension of the housing 12. Each sensing finger is mounted in a shouldered bore 37 in the plate 36 and is urged downwardly by means of a spring 38 extending between the shoulder of the bore 37 and a collar 40 on the sensing finger. Additionally, each sensing finger is provided with a head 41 which lies above the bar 32 and which terminates in a blade 42 adapted to engage certain gears which will be hereinafter described.

The bar 32 is spring-pressed downwardly by means of springs 43 which extend from the upper surface of the bar 32 to brackets 44 one of which is formed integrally with the bracket 13 and the other of which is supported directly from the housing 12.

Due to the construction mentioned as the shaft 16 and drum 25 rotate, cams 30 alternately raise and lower the bar 32 causing the sensing fingers to rise when the high points of cams 30 underlie the cam followers 31 and permitting the sensing fingers to fall when the cam followers 31 are on low points of the cams 30.

A control tape 45 (Figure 3) is fed from a reel 46 at one side of the machine between the drum 25 and the plate 36, the tape being taken up on a second reel 47 located at the opposite end of the machine, the tape passing over guide rollers 49 and being tensioned in any suitable manner.

Tape 45 is provided with sprocket holes 48 near its edges and is additionally supplied with three series of control holes 50 spaced apart across its width at the same spacing as that of the grooves 27, 28 and 29 across the drum 25 and of the sensing fingers 33, 34 and 35 across the plate 36.

Thus when the bar 32 is in its lowest position the sensing fingers are urged by their springs 38 against the control tape 45 and where a perforation is present in the tape the corresponding finger will pass through the tape. Conversely, if no perforation is present the sensing finger will remain elevated being held by the tape against the pressure of its spring 38; this positioning of the sensing fingers is utilized to determine the direction and amount of rotation of an output shaft.

As hereinbefore stated, the mutilated gear 14 intermittently drives the shaft 24. Mounted on the shaft 24 is a sleeve 51 which sleeve has fixed thereto at its left-hand end a bevel gear 52. This bevel gear meshes with a bevel gear 53 rotatably supported on a stub shaft extending downwardly from a bar 54 fixed to the housing 12. Mounted on the shaft 21 for rotation therewith is a bevel gear 55 which also meshes with the bevel gear 53. Thus as the shaft 21 is rotated in one direction the sleeve 51 is rotated in the opposite direction.

A differential spider 56 is mounted on shaft 21 for rotation therewith and a similar differential spider 57 is mounted at the right-hand end of sleeve 52 for rotation therewith. As will be obvious, these spiders rotate in opposite directions when shaft 21 is rotated. Spider 56 carries a differential pinion 58 and similarly spider 57 carries a differential pinion 60. Each of these differential pinions meshes with a pair of bevel gears, the bevel gears cooperating with pinion 58 being designated 61 and 62 and the bevel gears for pinion 60 being designated 63 and 64. Bevel gears 61, 62 and 64 are loosely mounted on the shaft 21 and bevel gear 63 is loosely mounted on the sleeve 51. Fixed to bevel gear 63 is a spur gear 65 which cooperates with the upwardly extending blade-like portion 42 of the left-hand one 33 of the sensing fingers. Fixed to or integral with the central bevel gears 61 and 64 is a spur gear 66 which cooperates with the blade-like portion 42 of the central sensing finger 34. In like manner, there is fixed to the right-hand one of the bevel gears 62 a spur gear 67 which cooperates with the blade-like portion 42 of the right-hand one 35 of the sensing fingers.

Extending across the housing 12 above the shaft 21 is a shaft 70 which carries a spur gear 71 which meshes with the central spur gear 66 the shaft being supported by bearing 72 at one side and by an output counter 73 at the other side of housing 12. Thus any rotation of the gear 66 is imparted to the gear 71 and through it to the output shaft 70 which is directly connected to the output counter 73.

Shaft 70 is driven through a unit of movement during the interval when the tape 45 is stationary and the sensing fingers 33, 34 and 35 are positioned vertically in accordance with the control perforations 50 in the tape 45. If the two outer sensing fingers 33 and 35 pass through the tape then these pins are lowered out of the path of the corresponding spur gears 65 and 67 and the blade-like portion 42 of the central sensing finger 34 lies in a tooth space of gear 66 and prevents it from rotating. The movement of gears 65 and 67 under drive of the sleeve 51 and shaft 21 respectively will be without effect.

If the two right-hand sensing fingers 34 and 35 pass through the tape 45 and the left-hand finger 33 finds no hole in the tape, then the gear 65 is prevented from rotating and the action of the differential gearing causes the central spur gear 66 to be rotated through a predetermined angular amount in one direction.

On the other hand, if the two left-hand sensing fingers 33 and 34 pass through the tape and the right-hand sensing finger 35 finds no hole therein, then spur gear 67 is prevented from rotating and the action of the differential causes the central spur gear 66 to be rotated through the same predetermined angle, but in a direction opposite to that in which it rotated when the gear 65 was held.

Thus by properly perforating the control tape 45 it is possible to advance the output shaft 70 through a unit of movement in either direction or to prevent any movement of the output shaft while the input shaft is advanced in a single direction through a predetermined angular movement.

The tape 45 is, by means of the sprocket holes 48, geared to the drum 25 for movement therewith and furthermore the pattern of perforations 50 is punched in the tape in particular relationship to the holes 48. Thus any change in length of the tape is without effect as respects the accuracy of the device since whether the tape has become shortened or elongated has no effect, the rotation of the output shaft being determined solely by the relationship of the feed holes 48 to the control perforations 50. Moreover, any change in the tape will be necessarily very small per unit of length and the total length of the tape is without effect as respects the ultimate control of the output shaft. The perforations 50 in the tape constitute a physical pattern for effecting control of the output shaft 70 and bear a definite predetermined relationship to the angular increments of movement of the input shaft.

Furthermore, all movement of the output shaft is prevented during the period when the tape is advancing since during this period the blade portions 42 of all three sensing fingers 33, 34 and 35 engage their respective spur gears and no movement of the output shaft can occur. There is also a positive interlock between the input and output shafts such that any movement attempted to be imparted to the output shaft will either be ineffective or will cause a breakage of the mechanism or will be reflected back to the input shaft to correspondingly modify the reading of the input counter 23. As a result it is impossible for the indication of the output counter 73 to be other than a true function, as determined by the control tape, of the real variable inserted by incremental rotation of the input shaft 10 as indicated on the input counter 23.

Of course, more than three sensing fingers may be utilized and the mechanism then arranged, for example, to cause double increments of movement in either direction in response to these fingers.

The function unit as above described has been considered primarily as a device for performing mathematical calculation. However, as is obvious and as is more fully explained in my copending application Serial No. 422,844, filed April 13, 1954, now Patent No. 2,770,145, issued November 13, 1956, this form of function unit is, like other units described in that application, readily utilized to control machine operations of a milling machine.

A number of the function units as hereinabove described may be connected together through combining apparatus such as differential drives to perform more involved mathematical solutions, in the manner which is described in detail in my copending application, particularly as respects two typical problems, one of which is to produce the product $xy$ by the process of squaring $(x+y)$, squaring $(x-y)$ and subtracting the latter from the former in a differential, the second of which is an arrangement for calculating the value of $r$ function $\theta$ (in a typical instance $r$ sine $\theta$) wherein the input shaft of one function unit is the input for the value of $r$ and the input shaft of the second function unit is utilized for inserting the value of $\theta$ expressed in any suitable angular measurement, the control tape of the second unit being arranged to cause the output shaft of that unit to turn through an amount proportional to sine $\theta$. Then in a differential the value of sine $\theta$ is added to $r$ while in another differential the value of sine $\theta$ is subtracted from $r$. In additional function units the value of $r+$sine $\theta$ is squared and the value of $r-$sine $\theta$ is squared. The output from these latter units is then fed to another differential whence they are subtracted yielding a value of $4r$ sine $\theta$. Obviously, by connecting the output through a 4:1 reduction gearing to a counter the value of $r$ sine $\theta$ may be directly read.

While I have described a single embodiment of my invention, and indicated a limited number of uses for this function unit, it is obvious that many other forms may be made utilizing the principles set forth herein. I wish therefore to be limited not by the description, which is given solely for illustrative purposes, but on the contrary, to be limited only by the claims granted to me.

What is claimed is:

1. A function unit comprising a rotatable input shaft the amount of rotation of which from a fixed reference point represents a real variable, a rotatable output shaft the amount of rotation of which from a fixed reference point represents a function of said real variable, pattern means bearing a physical pattern having predetermined characteristics arranged along a pattern path, said pattern means being in positive driven connection with said input shaft so as to impart movement to said pattern upon rotation of said input shaft, means adapted to connect said output shaft to said input shaft for drive therefrom, and means under control of said pattern means to effect said connection to thereby vary the amount of rotation of said output shaft from its said fixed reference point in accordance with said physical pattern and the movement imparted to said input shaft.

2. A function unit comprising a rotatable input shaft the amount of rotation of which from a fixed reference point represents a real variable, a rotatable output shaft the amount of rotation of which from a fixed reference point represents a function of said real variable, a tape bearing a physical pattern having predetermined characteristics arranged along a pattern path, said tape being in positive driven connection with said input shaft so as to impart movement to said pattern, means adapted to connect said output shaft to said input shaft for positive drive thereby, and means controlled by said physical pattern to effect said connection of said input shaft to said output shaft to thereby vary the amount of rotation of said output shaft from said fixed reference in accordance with said physical pattern and the rotation of said input shaft.

3. In a function unit, in combination, an input shaft, a sprocket drum driven by said input shaft, a tape having a predetermined physical pattern located longitudinally therealong, said tape being positively driven by said sprocket drum, an output shaft, said output shaft being adapted to be connected to said input shaft for positive drive thereby and means controlled by said physical pattern for effecting said connection and determining the amount of rotation of said output shaft for each incremental movement of said input shaft.

4. In a function unit, in combination, an input shaft, a sprocket drum driven by said input shaft, a tape having a plurality of feed holes located longitudinally thereof for cooperating with said sprocket drum to positively drive said tape, a predetermined physical pattern on said tape, an output shaft, said output shaft being adapted to be connected to said input shaft for positive drive thereby, and means controlled by said physical pattern for effecting said connection and determining the amount of rotation of said output shaft for each incremental movement of said input shaft.

5. In a function unit, in combination, an input shaft, a secondary shaft, means for intermittently positively driving said secondary shaft from said input shaft, an output shaft, an intermediate shaft, means for intermittently driving said intermediate shaft from said input shaft alternately with the drive of said secondary shaft, a tape, means positively driving said tape from said secondary shaft, a pattern of perforations arranged in said tape in a predetermined manner, and means controlled by said pattern of perforations for connecting said output shaft to said intermediate shaft for drive thereby.

6. A function unit as claimed in claim 5, characterized in that said controlling means comprises means for sensing the elements of said pattern and means operated by said sensing means for effecting said connection of said output shaft to said intermediate shaft.

7. A function unit as claimed in claim 6, characterized in that said intermediate shaft has a sleeve thereon, said sleeve being geared to said intermediate shaft for rotation in the reverse direction and at the same rate as said intermediate shaft, and further characterized in that the connection between said output shaft and said intermediate shaft comprises a first differential connected to said shaft and a second differential connected to said sleeve, said sensing means being effective to prevent either or both of said differentials from operating to thereby effect positive drive of said output shaft in either direction or to prevent movement thereof in accordance with the pattern present on said tape at each position of advance thereof.

8. In a function unit, in combination, an input shaft, a secondary shaft, gear means for driving said secondary shaft from said input shaft, a sprocket drum mounted on said secondary shaft, a tape having longituridinally extending feed holes cooperating with said sprockets, said tape having a predetermined pattern of perforations therein, a plurality of sensing fingers, means normally pressing said fingers against said tape, cam means for moving said fingers away from said tape, an intermediate shaft, means driving said intermediate shaft from said input shaft alternately and intermittently with the drive of said secondary shaft, said intermediate shaft, sensing fingers and secondary shaft lying in substantially the same plane, a pair of differentials mounted on said intermediate shaft, means driving said differentials in opposite directions from said input shaft, an output shaft, means common to said differentials driving said output shaft, and means on said sensing fingers for preventing operation of one or both of said differentials to thereby cause operation of said output shaft in either direction or prevent operation thereof during each advance of said tape under drive of said sprocket wheel.

9. In a calculating device of the class described, in combination, an input shaft, means for driving said input shaft intermittently, a drum mounted on said input shaft, said drum being provided with sprocket teeth, a tape having perforations therein, said perforations being arranged in a predetermined manner, and said tape being advanced in a purely translational movement, a pair of cams mounted on said input shaft, a framework mounted above said drum, said framework being provided with cam rollers cooperating with said cams, a plurality of feeler pins mounted in said framework, said feeler pins being adapted to sense the perforations in said tape, said cams and cam rollers serving to remove said feeler pins from said tape and permit advance thereof during each incremental step of movement of said input shaft, an output shaft, an intermediate shaft driven by said driving means intermittently and alternately with the driving of said input shaft, a pair of differentials mounted on said intermediate shaft and adapted to be driven in opposite directions, a spur gear connected with one ring gear of each differential, a spur gear connected to the other ring gears of both of said differentials, a head on each of said feeler pins, each of said heads cooperating with one of said spur gears, and a gear connection between said last mentioned spur gear and said output shaft, whereby those feeler pins which fail to find perforations in the tape enter into the tooth spaces of their cooperating spur gears and determine the direction of movement of said output shaft.

10. In a calculating device of the class described, in combination, an input shaft, means for intermittently driving said input shaft, a drum mounted on said input shaft, said drum being provided with sprocket teeth, a tape having feed perforations therein adapted to cooperate with said drum teeth, said tape having additional perforations therein arranged in a predetermined manner, said tape being advanced in a purely translational movement by means of said drum teeth, a plurality of feeler pins mounted above said drum to cooperate with said perforations in said tape, means for raising said feeler pins into cooperation with said tape during the initial stages of movement of said feed drum and for lowering said feeler pins into contact with said tape during the terminating portion of the movement of said feed drum, an intermediate shaft driven by said input shaft intermittently and alternately with the drive of said input shaft, a pair of differentials mounted on said intermediate shaft adapted to be driven in opposite directions, said differentials having a common driven portion, means on said differentials and said common driven portion cooperating with said feeler pins, an output shaft, and a gear connection between said common portion of said differentials and said output shaft whereby those feeler pins which fail to enter perforations in said tape block the movement of cooperating differentials and determine the direction of unit movement of said output shaft resulting from each unit movement of said input shaft.

11. In a function unit, in combination, an input shaft, a sprocket drum driven by said input shaft, a tape having a plurality of feed holes located longitudinally thereof for cooperating with said sprocket to positively drive said tape, a plurality of perforations arranged in a predetermined pattern longitudinally of said tape, sensing fingers for cooperating with said perforations, means for causing said fingers to sense the said tape at discrete intervals, an output shaft, and means controlled by said fingers for drivably connecting said output shaft intermittently to said input shaft, said means being arranged so that at each sensing said output shaft is driven through a discrete increment of rotation or is locked in position in accordance with the sensing of perforations by said fingers.

12. In a function unit, in combination, an input shaft, a sprocket drum driven by said input shaft, a tape having a plurality of feed holes located longitudinally thereof for cooperating with said sprocket to positively drive said tape, a plurality of perforations arranged in predetermined sets of patterns longitudinally of said tape, sensing fingers for cooperating with said perforations, means for causing said fingers to sense the said tape at discrete intervals, an output shaft, and means controlled by said fingers for drivably connecting said output shaft intermittently to said input shaft, said means being arranged so that at each sensing said output shaft is driven through one or more increments of rotation in a forward or backward direction or is locked in position according to the presence or absence of perforations, at the sensing position, in said sets of patterns.

References Cited in the file of this patent

UNITED STATES PATENTS

| | | |
|---|---|---|
| 1,377,844 | McCutchen et al. | May 10, 1921 |
| 2,115,602 | Whitby | Apr. 26, 1938 |
| 2,339,976 | Brown | Jan. 25, 1944 |
| 2,470,589 | Torkelson | May 17, 1949 |
| 2,581,109 | Kenngott | Jan. 1, 1952 |
| 2,650,500 | Stibitz | Sept. 1, 1953 |
| 2,770,145 | Stibitz | Nov. 13, 1956 |